March 10, 1970 R. L. MATTINGLY ET AL 3,500,254
MICROWAVE ANGLE RESOLVER
Filed Dec. 15, 1967 3 Sheets-Sheet 1

INVENTORS  R. L. MATTINGLY
W. W. MUMFORD
BY Walter M. Hill
ATTORNEY

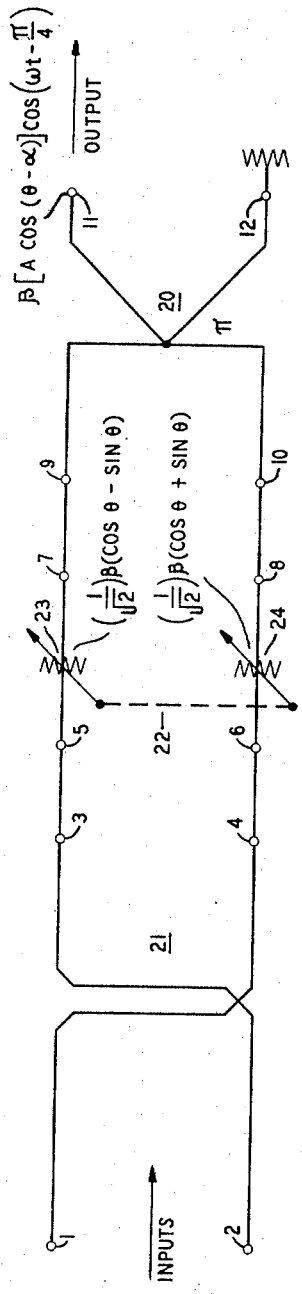
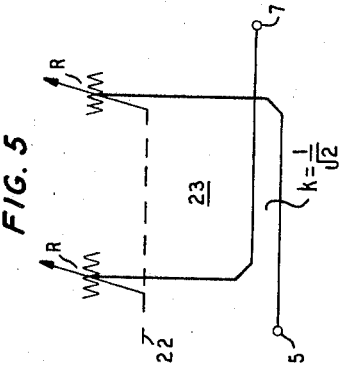
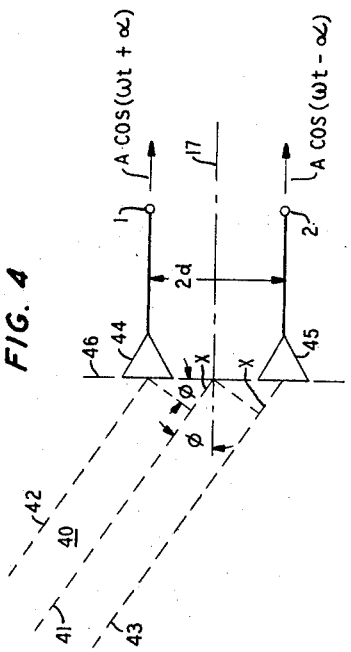

United States Patent Office 3,500,254
Patented Mar. 10, 1970

3,500,254
MICROWAVE ANGLE RESOLVER

Robert L. Mattingly, Morristown, and William W. Mumford, Parsippany-Troy Hills Township, Morris County, N.J., assignors to Bell Telephone Laboratories, Incorporated, Murray Hill, N.J., a corporation of New York
Filed Dec. 15, 1967, Ser. No. 690,961
Int. Cl. H01p 5/14
U.S. Cl. 333—10                                         5 Claims

ABSTRACT OF THE DISCLOSURE

A broadband angle resolver employing directional coupler and hybrid junction devices interconnected through variable attenuators. The attenuators introduce voltage transmission coefficients proportional to functions of an arbitrary angle and when this arbitrary angle is made equal to the phase angles of alternating signals received by the resolver, the voltage at one output port of the resolver will reach a maximum while the voltage at another output port will reach a null. The output from the null port is used to automatically control the attenuators while the maximum output from the other port is applied to a utilization means. Since the variable elements of the attenuators are essentially pure resistances, the resolver is insensitive to frequency and thereby rendered broadband.

GOVERNMENT CONTRACT

The invention herein claimed was made in the course of or under contract with the Department of the Army.

BACKGROUND OF THE INVENTION

This invention relates to phased array antenna systems and more particularly to a broadband angle resolver for determining the phase angles of the signals arriving at symmetrically disposed antenna elements in the array.

The angle at which a microwave beam arrives at the face of an array antenna is directly related to and determines the phase angles of the signals as they arrive at the several elements of the antenna array so that the arrival angle of the beam may be determined by resolving the phase angles of the signals. This angle resolution has generally been accomplished by mircowave circuit structures which are frequency sensitive so that the angle resolution is subject to serious errors due to frequency variations. Some of these prior structures involve mechanically driven variable capacitors which are inherently frequency sensitive as well as intolerably slow for modern phased array applications. Higher speeds are achieved by electronically switched digital phase shifters but these are usually reactive and hence frequency sensitive. Electronically switchable transmission lines have been proposed as digital phase shifters and, while these may be made essentially independent of frequency, they become impractical in large arrays because of their size and cost and also because the steering orders become quite complex.

In the copending application of R. S. Engelbrecht Ser. No. 690,846 filed on even date herewith and assigned to the same assignee, a broadband microwave angle resolver is disclosed and claimed which comprises two directional couplers and three hybrid junctions. The two input signals are applied, respectively, to only one port of each directional coupler.

SUMMARY OF THE INVENTION

A microwave angle resolver in which two ports of a 3 db directional coupler device are coupled to two ports of a hybrid junction device through attenuators arranged to simultaneously introduce attenuation proportional, respectively, to two different trigonometric functions of the same arbitrary angle. If input alternating signals of the same frequency and having phase angles which are equal but of opposite sign are applied to two of the remaining ports of one of the devices, the voltage at a third port of the other device will reach a maximum when the arbitrary angle of the attenuators is adjusted to equal the phase angles of the alternating signals. By coupling a third device to the one receiving the alternating signals, a null output is derived for automatically controlling the attenuators to keep the arbitrary angle equal to the phase angles of the alternating signals.

BRIEF DESCRIPTION OF THE DRAWINGS

The invention may be better understood by reference to the accompanying drawings in which:

FIG. 3 discloses a variant of the embodiment shown in FIG. 2;

FIG. 4 discloses two symmetrically disposed receiving antennas for receiving alternating signals having phase angles which may be resolved by the circuits of this invention;

FIG. 5 discloses an attenuator of a type suitable for use in the practice of this invention.

DETAILED DESCRIPTION

Figure 1:
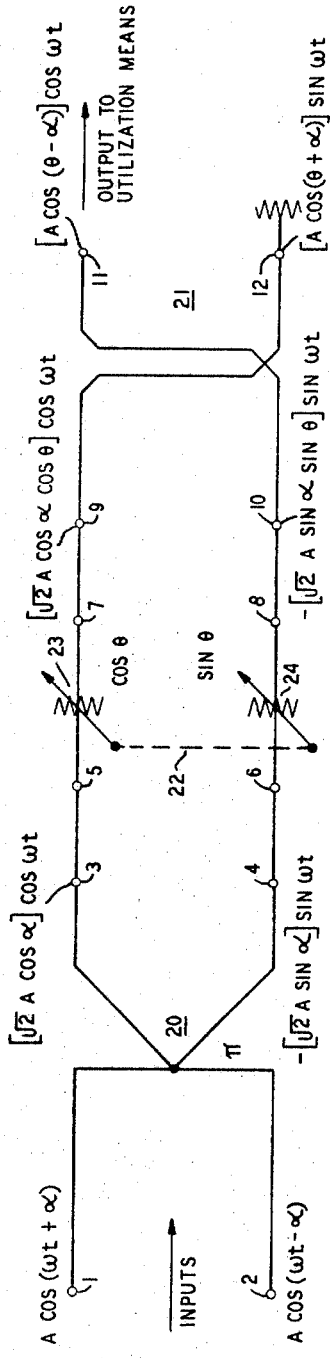
FIGS. 1 and 2 disclose two embodiments of the invention.

The embodiment of the invention shown in FIG. 1 discloses a hybrid junction 20 having four ports 1, 2, 3 and 4. Ports 3 and 4 of hybrid junction 20 are coupled, respectively, to ports 9 and 10 of a 3 db directional coupler through a pair of transmission paths including mircrowave attenuators 23 and 24. Port 3 is coupled to the input port 5 of attenuator 23 while the output port 7 of the attenuator is coupled to port 9 of the directional coupler. Similarly port 4 is coupled to port 6 of attenuator 24 while its output port 8 is coupled to port 10 of the directional coupler. Attenuators 23 and 24 introduce voltage transmission coefficients in their respective paths proportional to the cosine and the sine, respectively, of the same arbitrary angle $\theta$. In order to cause these two attenuators to introduce coefficients proportional to the same angle, they are arranged for simultaneous operation by means of a common control means 22, here represented symbolically by a dotted line connecting the variable control means of the two attenuators.

It is a property of hybrid junctions which are terminated in their characteristic impedances that the input ports are isolated each from the other and it can be shown that if two alternating signals are applied to these two input ports which have the same frequency but differ by equal phase angles of opposite sine, the outputs at the other two ports will differ in phase by 90 electrical degrees and have amplitudes proportional to the cosine and sine functions, respectively, of the phase angles of the two input signals. Specifically, FIG. 1 shows the two input signals at ports 1 and 2 to have the same frequency $\omega$ and both phase angles equal to $\alpha$ but of opposite sine. Under these conditions, the amplitude of the signal appearing at port 3 will vary as the cosine of $\alpha$ while the amplitude of the signal at port 4 will vary as the sine of $\alpha$. Attenuator 23 changes the amplitude of the signal it receives by the coefficient cosine $\theta$ while attenuator 24 changes the amplitude of the signal it receives by the coefficient sine $\theta$. These two modified signals enter directional coupler 21 at ports 9 and 10 and can be shown to emerge at port 11 with an amplitude proportional to the cosine of the difference between the arbitrary angle $\theta$ and the phase angles α of the input signals, while at port 12 they will emerge proportional in amplitude to the cosine of the sum of these angles. The output at port 12 is not a useful output and, therefore, this port is simply terminated in its characteristics impedance. The output at port 11 will reach a maximum in amplitude when the arbitrary angle θ controlling the attenuators 23 and 24 is made equal to the phase angles of the two input signals. This output is useful and may be applied to a suitable utilization means.

The two input signals are typically obtained from two symmetrically disposed receiving elements in a phase array antenna. This is symbolically illustrated in FIG. 4 which shows two receiving antenna elements 44 and 45 symmetrically disposed about a central axis 17 with their front faces coplanar as illustrated by line 46. The distance between these two antenna elements is given as 2d, the distance d being the distance between the central axis 17 and the axis of either of the receiving elements. A signal beam 40 arriving at an angle φ with reference to the central axis 17 will have its wave front arriving first at antenna element 44 and a short time later at receiving element 45. Beam element 41, being the central element, must travel a distance x to reach antenna plane 46 after beam element 42 arrives at antenna element 44. Similarly, beam element 43 travels an equal distance x to reach antenna element 45 after the central element 41 reaches the antenna plane 46. Under these conditions, it can be shown that the phase angle α of each of the two signals received by the antenna elements 44 and 45 is expressed by the equation directly below FIG. 4. In this expression, λ is the wavelength of the incoming signals. The output from antenna element 44 is applied as a signal to input port 1 while the output from antenna element 45 is applied as a signal to input port 2, the signal at input port 1 being advanced in phase by the angle α while the signal at port 2 being retarded in phase by the same angle. These angles are with reference to the phase of the beam signal element 41 arriving at the central axis 17 in the plane of the antenna elements.

In the arrangement shown in FIG. 1, hybrid junction 20 is shown placed at the input end while the directional coupler 21 is shown at the output end. A hybrid junction in this arrangement might restrict the operating bandwidth of the resolver as its sum port usually has a wider band than its difference port. Since wide band directional couplers are more readily available than are wide band hybrid junctions, advantage is taken of the reciprocal properties of the network shown in FIG. 1 by interchanging the hybrid junction and directional coupler devices as shown in FIG. 2.

Figure 2:
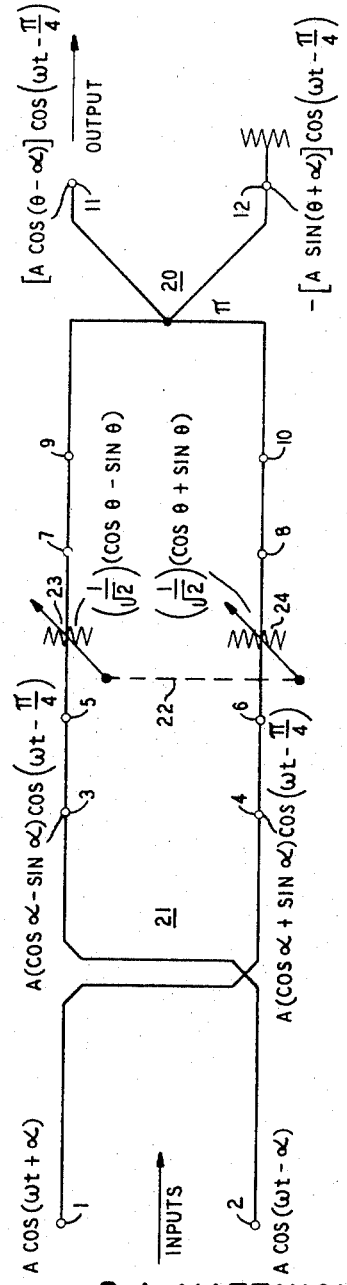

FIG. 2 is essentially the same as FIG. 1 except that the directional coupler 21 is shown at the input end and hybrid junction 20 is shown at the output end. The reference numerals of the input and output devices, however, have been retained in the same order as shown in FIG. 1. The circuit operates in the same way as described for FIG. 1 although the voltages appearing at the several ports will be somewhat different and these have been shown in FIG. 2. The useful output at port 11 of hybrid junction 20 still has an amplitude proportional to the cosine of the difference between the arbitrary angle θ and the phase angles α of the input signals and this output is applied to the utilization means as the useful output. Although the attenuators are still caused to introduce a voltage transmission coefficient as a function of the same arbitrary angle θ, the coefficient of attenuator 23 is now made proportional to the difference between the cosine and the sine of this angle while that of attenuator 24 is made proportional to the sum of the cosine and the sine of the same angle. As in the case of FIG. 1, control 22 is caused to change angle θ until it equals the phase angles of the input signals. Equality is reached when the output at port 11 reaches a maximum.

FIG. 3 is essentially the same as FIG. 2 except that an additional amplitude function β is applied to the two attenuators 23 and 24. This will cause the amplitude of the output at port 11 to also vary proportional to the same factor and is useful where certain symmetrical elements in a phased antenna array should be given an amplitude taper to shape the beam. As in the case of FIGS. 1 and 2, the output at port 12 is not useful so that this port is merely terminated in its characteristic impedance.

FIG. 5 shows the attenuator 23 of FIGS. 1, 2 and 3 to be of a type similar to that shown in United States Patent 3,264,586 granted Aug. 2, 1966 to M. Rabinowitz. The attenuator comprises a 3 db directional coupler with input port 5, output port 7 and two additional ports terminated in equal variable resistances R. When the two terminating resistances are made equal to the characteristic impedance, a signal introduced at port 5 will be divided by the directional coupler and totally absorbed by the two terminating resistances. Under this condition there will be no energy appearing at port 7. As the resistances are simultaneously increased or decreased, a voltage will appear at port 7 which may be either in phase with the voltage applied to port 5 or exactly out of phase depending upon whether the resistances are made larger or smaller than the characteristic impedance. Since the terminating resistances R are designed to appear as substantially pure resistances at all times, the attenuator will be practically independent of frequency over a very wide band. While the attenuator shown in FIG. 5 is specifically disclosed as attenuator 23 of FIGS. 1, 2 and 3, it is to be understood that attenuator 24 is of the same construction.

Figure 6:
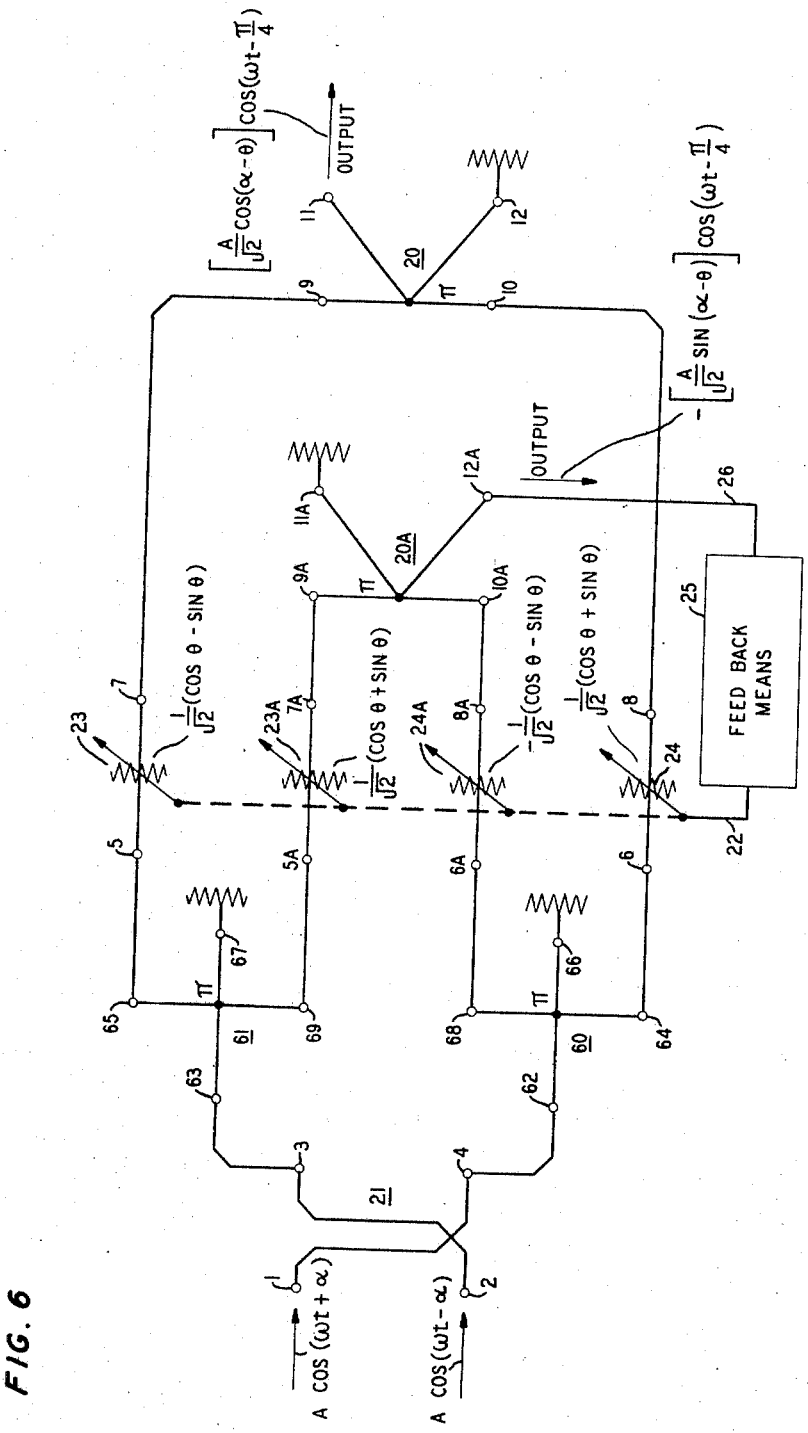
FIG. 6 discloses an additional embodiment of the invention providing a null output for automatically controlling the attenuators.

FIG. 6 discloses an arrangement essentially identical with that shown in FIG. 2 except that additional hybrid junctions 60 and 61 have been included in the transmission paths between the directional coupler 21 and the hybrid junction 20. Hybrid junction 61, having ports 63, 65, 67 and 69 is included between port 3 of the directional coupler 21 and port 5 of attenuator 23 while hybrid junction 60 is included between port 4 of directional coupler 21 and port 6 of attenuator 24. Ports 66 and 67 of these two hybrid junctions are terminated in their characteristic impedances. The inputs to attenuators 23 and 24 are derived from ports 65 and 64 of the two hybrid junctions. The circuit thus far described operates in essentially the same manner as previously described for FIGS. 1 and 2 with the useful output being obtained from output port 11 of hybrid junction 20, this output reaching a maximum amplitude when the arbitrary angle θ of the attenuators is made equal to the phase angle α of the input signals applied to ports 1 and 2. It is to be understood that ports 1 and 2 of directional coupler 21 correspond to ports 1 and 2 of FIGS. 1 through 4.

The purpose of the additional hybrid junctions 60 and 61 is to provide additional outputs for another hybrid junction 20A which may be arranged to deliver a null output at one of its ports when the arbitrary angle θ of the attenuators is made equal to the phase angle of the input signals. This output then may be used in a conventional manner to automatically control the attenuators to cause them to maintain angle θ equal to the phase angle α of the input signals.

As shown in FIG. 6, the additional hybrid junction 20A is coupled to ports 3 and 4 of directional coupler 21 in a manner similar to that shown and described for the coupling between ports 3 and 4 to the hybrid junction 20. Ports 68 and 69 are coupled to ports 10A and 9A, respectively, of hybrid junction 20A through attenuators 24A and 23A. Specifically, port 68 of hybrid junction 60 is coupled to port 6A of attenuator 24A while port 8A of attenuator 24A is coupled to port 10A of hybrid junction 20A. Similarly, port 69 of hybrid junction 61 is coupled to port 5A of attenuator 23A while port 7A of attenuator 23A is coupled to port 9A of hybrid junction 20A. Attenuators 23 and 24A are caused to simultaneously introduce voltage transmission coefficients proportional to the difference between the sine and the cosine of the arbitrary angle $\theta$ while attenuators 23A and 24 introduce coefficients proportional to their sum. These attenuators are all simultaneously under control of the control link 22 leading from the output end of feedback means 25 which in turn receives the output from port 12A of hybrid junction 20A by way of circuit path 26.

Under the conditions described for FIG. 6, it can be shown that input signals as shown in FIG. 4 applied to ports 1 and 2 of FIG. 6 will approach a null at port 12A as the angle $\theta$ is caused to approach the phase angle $\alpha$ of the two input signals. Simultaneously, the output at port 11 of hybrid junction 20 will approach a maximum. The voltages at these two output ports 11 and 12A are shown in FIG. 6. It will be understood that the output link 22 from the feedback means 25 may be an electrical path if all four attenuators are of a type which may be electronically controlled as, for example, PIN diodes. On the other hand, the feedback means 25 may contain electromechanical structure which mechanically varies the values of the terminating resistances in the four attenuators in the manner suggested in the Rabinowitz patent. Servomechanisms and feedback circuit means capable of performing these functions are so well known in the art that further description thereof is unnecessary.

It will be evident to those skilled in this art that various modifications may be made within the scope of this invention. For example, other types of directional couplers, hybrid junctions and attenuators may be substituted for those specifically disclosed herein to illustrate the invention.

What is claimed is:

1. A broadband microwave angle resolver comprising a 3 db directional coupler device and a hybrid junction device, each device having four ports, means applying alternating signals to first and second ports of one of said devices, said signals having the same frequency and equal but opposite phase angles, two transmission paths coupling third and fourth ports of said one device to first and second ports, respectively, of the other device, variable attenuators in each of said paths to simultaneously provide voltage transmission coefficients therein proportional, respectively, to the difference and the sum of the cosine and sine functions of an arbitrary angle independent of said phase angles to cause the voltage at a third port of said other device to reach a maximum when said arbitrary angle is made equal to the phase angles of said two alternating signals.

2. A broadband microwave angle resolver comprising a 3 db directional coupler device and a hybrid junction device, each device having four ports, means applying alternating signals to first and second ports of said directional coupler device, said signals having the same frequency and equal but opposite phase angles, two transmission paths coupling third and fourth ports of said directional coupler device to first and second ports, respectively, of the hybrid junction device, variable attenuators in each of said paths to simultaneously provide voltage transmission coefficients therein proportional, respectively, to the difference and the sum of the cosine and sine functions of an arbitrary angle independent of said phase angles to cause the voltage at a third port of said hybrid junction device to reach a maximum when said arbitrary angle is made equal to the phase angles of said two alternating signals.

3. A broadband microwave angle resolver comprising a 3 db directional coupler having four ports, means for applying alternating signals to two of said ports, said signals having the same frequency and equal but opposite phase angles, first and second hybrid junctions each having four ports, means terminating one port of each junction in its characteristic impedance, means coupling a second port of each junction, respectively, to the remaining two ports of said directional coupler, third and fourth hybrid junctions each having four ports, first and second transmission paths respectively coupling a third port of each of said first and second hybrid junctions to two of the ports of said third hybrid junction, third and fourth transmission paths respectively coupling the fourth port of each of said first and second hybrid junctions to two of the ports of said fourth hybrid junction, means terminating a third port of each of said third and fourth hybrid junctions in its characteristic impedance, and variable attenuators in said four transmission paths to simultaneously provide voltage transmission coefficients therein proportional to trigonometric functions of the same arbitrary angle, whereby the voltage appearing at the fourth port of said third hybrid junction will reach a maximum for application to a utilization means while the voltage appearing at the fourth port of said fourth hybrid junction will reach a null as said arbitrary angle is made equal to the phase angles of the alternating signals applied to said directional coupler.

4. The combination of claim 3 wherein the voltage transmission coefficients provided by the attenuators in two of said transmission paths are proportional to the difference between the sine and cosine functions while those provided by the attenuators in the remaining two transmission paths are proportional to the sum of said functions.

5. The combination of claim 3 and a feedback means coupling the fourth port of said fourth hybrid junction to said attenuators to automatically adjust said attenuators until the output at the fourth port of said fourth hybrid junction reaches a null.

References Cited

UNITED STATES PATENTS

| 2,817,813 | 12/1957 | Rowen et al. | 333—10 X |
| 3,323,080 | 5/1967 | Schwelb et al. | 333—11 |
| 3,381,244 | 4/1968 | Dalley | 333—11 X |

H. K. SAALBACH, Primary Examiner

P. L. GENSLER, Assistant Examiner

U.S. Cl. X.R.

328—155; 333—11, 17, 81